(12) United States Patent
Bosnic, Jr. et al.

(10) Patent No.: US 9,634,996 B2
(45) Date of Patent: *Apr. 25, 2017

(54) MAPPING AND OBSCURING DIGITAL REPRESENTATIONS OF A NUMBER OF USER ACCOUNTS ON A SOCIAL NETWORK MAP

(71) Applicant: International Business Machines Corporation, Armonk, NY (US)

(72) Inventors: Cameron J. Bosnic, Jr., Dracut, MA (US); Vijay Francis, Townsend, MA (US); Jacob M. Lineberry, Littleton, MA (US); Scott H. Prager, Stratham, NH (US); Erika Varga, Harvard, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,136

(22) Filed: Feb. 5, 2015

(65) Prior Publication Data
US 2016/0232378 A1    Aug. 11, 2016

(51) Int. Cl.
*H04L 29/06* (2006.01)
*H04L 29/08* (2006.01)
(Continued)

(52) U.S. Cl.
CPC ........ *H04L 63/04* (2013.01); *G06F 17/30867* (2013.01); *G06F 21/6245* (2013.01);
(Continued)

(58) Field of Classification Search
CPC ............................ G06F 21/64; G06F 17/30867
See application file for complete search history.

(56) References Cited

U.S. PATENT DOCUMENTS

2009/0265233 A1* 10/2009 Sendo .................... G06Q 30/02
705/14.39
2012/0227086 A1* 9/2012 Dale ...................... G06Q 50/01
726/3
(Continued)

OTHER PUBLICATIONS

Bongen et al.,Organizing Public Record of Social Transaction, Apr. 2009, ACM, CHI 09 Extended Abstracts on Human Factors in Computing Systems, pp. 4507-4512.*
(Continued)

*Primary Examiner* — Harvey Cohen
(74) *Attorney, Agent, or Firm* — Steven L. Nichols; Fabian Vancott

(57) ABSTRACT

Mapping and obscuring digital representations of a number of user accounts on a social network map includes identifying a primary user account from a number of user accounts of a social network, determining, based on metadata associated with the user accounts, a relationship for each of the user accounts relative to the primary user account, mapping, based on the relationship for each of the user accounts relative to the primary user account, a digital representation of each of the user accounts to a territory on a social network map, determining, based on the relationship for each of the user accounts relative to the primary user account, an obscurity level for each of the user accounts, and obscuring, based on the obscurity level, the territory associated with the digital representation of each of the user accounts on a social network map from the primary user account.

21 Claims, 9 Drawing Sheets

(51) Int. Cl.
  *G06F 21/64* (2013.01)
  *G06Q 50/00* (2012.01)
  *G06Q 30/02* (2012.01)
  *G06F 17/30* (2006.01)
  *G06F 21/62* (2013.01)

(52) U.S. Cl.
  CPC ......... *G06F 21/64* (2013.01); *G06Q 30/0214* (2013.01); *G06Q 50/01* (2013.01); *H04L 63/0407* (2013.01); *H04L 67/306* (2013.01)

(56) References Cited

U.S. PATENT DOCUMENTS

| | | | |
|---|---|---|---|
| 2012/0317198 A1 | 12/2012 | Patton | |
| 2013/0073972 A1 | 3/2013 | Yung et al. | |
| 2013/0218687 A1* | 8/2013 | Sohangir | G06F 17/30867 705/14.66 |
| 2013/0262203 A1* | 10/2013 | Frederick | G06Q 30/0209 705/14.12 |
| 2014/0207865 A1* | 7/2014 | Carr | H04L 67/2833 709/204 |
| 2014/0245407 A1* | 8/2014 | Vernal | G06F 21/41 726/5 |
| 2014/0258021 A1* | 9/2014 | Akin | G06Q 30/0631 705/26.7 |
| 2015/0095151 A1* | 4/2015 | Kanattu | G06Q 50/01 705/14.53 |
| 2015/0120717 A1* | 4/2015 | Kim | G06F 17/30699 707/727 |
| 2015/0245168 A1 | 8/2015 | Martin | |

OTHER PUBLICATIONS

Helic et al., Building Directories for Social Tagging Systems, Oct. 2011, ACM, CIKM11 Proceedings, pp. 525-534.*
Wang et al., A Novel Social Network Visualization Tool, 2013, IEEE Conference Publications, pp. 25-32.*
Malhotra et al., Studying User Footprints in Different Online Social Networks, 2012, IEEE Conference Publications, pp. 1065-1070.*
Siriteanu et al., MeetYou—SocialNetworkingOnAndroid, IEEE Conference Publications, 2013, pp. 1065-1070.*
List of IBM Patents or Patent Applications Treated as Related, Feb. 17, 2016, pp. 1-2.

* cited by examiner

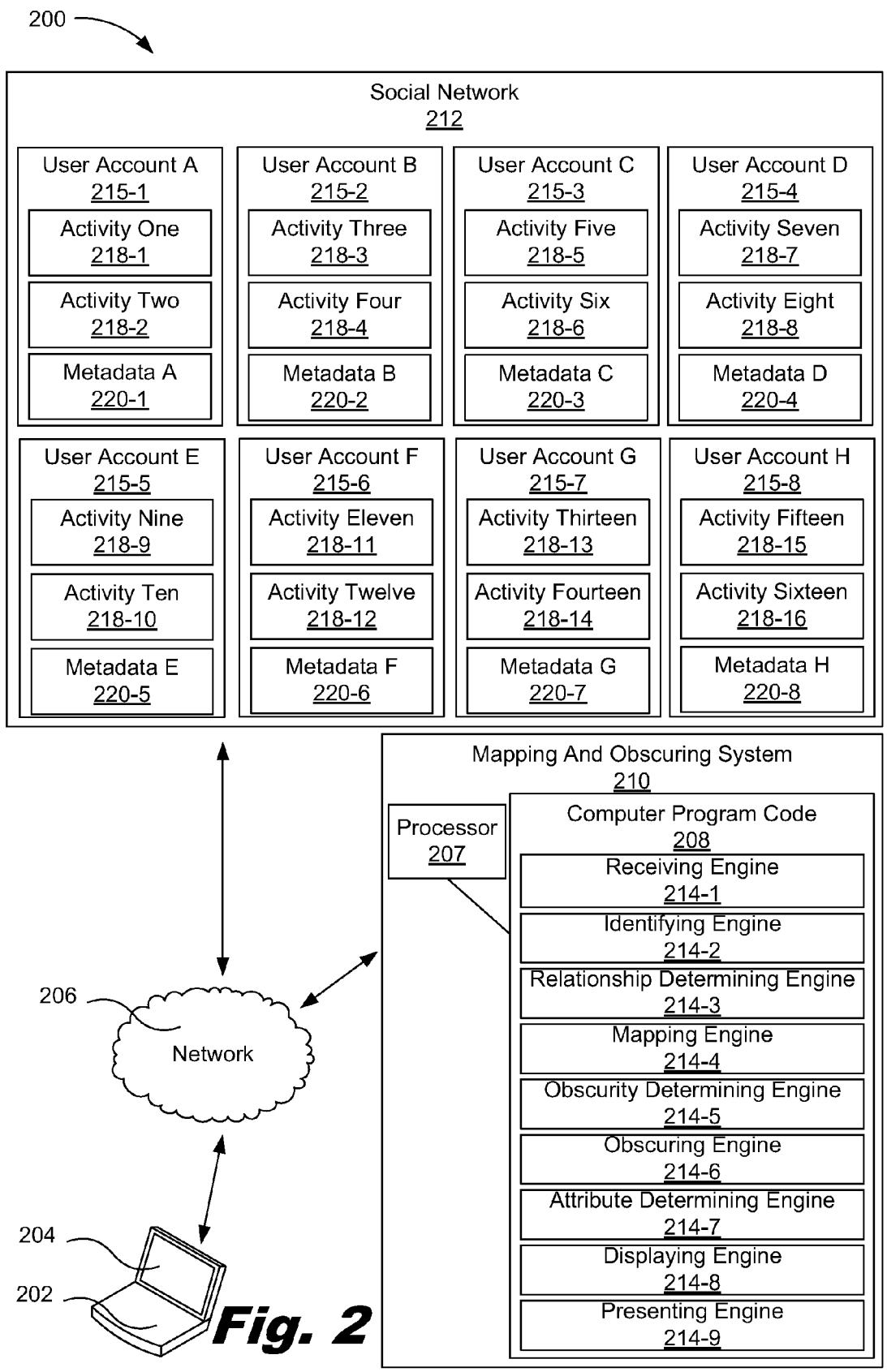

MAPPING AND OBSCURING DIGITAL REPRESENTATIONS OF A NUMBER OF USER ACCOUNTS ON A SOCIAL NETWORK MAP

BACKGROUND

The present invention relates to mapping and obscuring digital representations of a number of user accounts, and more specifically, to mapping and obscuring digital representations of a number of user accounts on a social network map.

A social network is a network based application to enable a user to create a user account. Once the user account is created, the user establishes connections with other users, such as friends, family, and colleagues in an online environment. Further, once the user is connected with other users, the user may share information, in the form of messages, with each of the other users on the social network system by uploading pictures, updating personal information, updating status information, commenting on other user's information, among other activities.

BRIEF SUMMARY

A method for mapping and obscuring digital representations of a number of user accounts on a social network map includes identifying a primary user account from a number of user accounts of a social network, determining, based on metadata associated with the user accounts, a relationship for each of the user accounts relative to the primary user account, mapping, based on the relationship for each of the user accounts relative to the primary user account, a digital representation of each of the user accounts to a territory on a social network map, determining, based on the relationship for each of the user accounts relative to the primary user account, an obscurity level for each of the user accounts, and obscuring, based on the obscurity level, the territory associated with the digital representation of each of the user accounts on a social network map from the primary user account.

A system for mapping and obscuring digital representations of a number of user accounts on a social network map includes a processor, computer program code, communicatively coupled to the processor, the computer program code including a receiving engine to receive metadata from user accounts associated with a social network, an identifying engine to identify a primary user account from the user accounts of the social network, a relationship determining engine to determine, based on the metadata associated with the user accounts, a relationship for each of the user accounts relative to the primary user account, a mapping engine to map, based on the relationship for each of the user accounts relative to the primary user account, a digital representation of each of the user accounts to a territory on a social network map, an obscurity determining engine to determine, based on the relationship for each of the user accounts relative to the primary user account, an obscurity level for each of the user accounts, an obscuring engine to obscure, based on the obscurity level, the territory associated with the digital representation of each of the user accounts on a social network map from the primary user account, an attribute determining engine to determine a display attribute for each of the user accounts, the display attribute representing contact, relationship, or activity criteria associated with the each of the user accounts, a displaying engine to display the social network map on a display of a user device for a user associated with the primary user account, and a presenting engine to present a digital reward to the primary user account based on exploration of the social network map.

A computer program product includes a computer readable storage medium, the computer readable storage medium having computer readable program code embodied therewith. The computer readable program code having computer readable program code to identify a primary user account from user accounts of a social network, determine, based on the metadata associated with the user accounts, a relationship for each of the user accounts relative to the primary user account, map, based on the relationship for each of the user accounts relative to the primary user account, a digital representation of each of the user accounts to a territory on a social network map, and obscure, based on an obscurity level, the territory associated with the digital representation of each of the user accounts on a social network map from the primary user account.

BRIEF DESCRIPTION OF THE SEVERAL VIEWS OF THE DRAWINGS

The accompanying drawings illustrate various examples of the principles described herein and are a part of the specification. The examples do not limit the scope of the claims.

FIG. 2 is a diagram of a system for mapping and obscuring digital representations of a number of user accounts on a social network map, according to one example of principles described herein.

DETAILED DESCRIPTION

Figure 1:
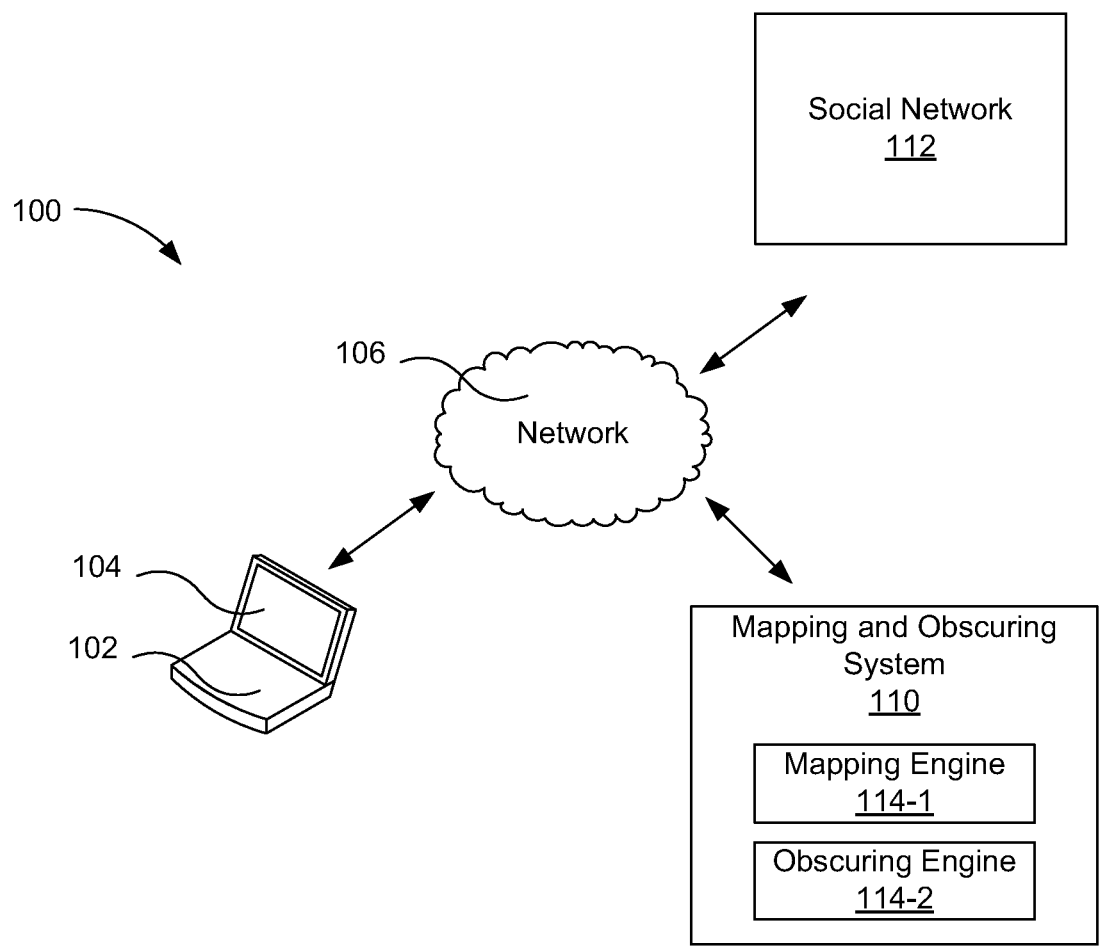
FIG. 1 is a diagram of a system for mapping and obscuring digital representations of a number of user accounts on a social network map, according to one example of principles described herein.

The present specification describes a method and system for mapping and obscuring digital representations of a number of user accounts on a social network map, such that a user of a primary user account is encouraged to explore the social network map.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a social network is a network based application to enable a user to create a user account and share information with other users. Often, the information shared between the users is presented in an activity stream. The activity stream displays the information shared between the users in a chronological order. The most recent information is displayed at the top of the activity stream. Further, the further down a user scrolls on the activity stream, the older the information.

While the activity stream displays the information shared between the users in a chronological order, the activity stream does not encourage users to expand their social network. If the user is not encouraged to expand their social network, the user's social network may have a few established connections with other users. Further, with a few established connections with other users, the user may be less likely to access the social network. As a result, the user spends less time engaging with other users and developing their social network.

The principles described herein include a system and a method for mapping and obscuring digital representations of a number of user accounts on a social network map. Such a method includes identifying a primary user account from a number of user accounts of a social network, determining, based on metadata associated with the user accounts, a relationship for each of the user accounts relative to the primary user account, mapping, based on the relationship for each of the user accounts relative to the primary user account, a digital representation of each of the user accounts to a territory on a social network map, determining, based on the relationship for each of the user accounts relative to the primary user account, an obscurity level for each of the user accounts, and obscuring, based on the obscurity level, the territory associated with the digital representation of each of the user accounts on a social network map from the primary user account. Such a method and system allows the digital representations of the user accounts to be mapped and obscured on a social network map. As a result, the primary user is encouraged to explore the social network map.

In the specification and appended claims, the term "user account" means a digital account created by a user on a social network. The user account may be accessed via a user name and password created by the user at time of registration. The user may specify information related to the user account as metadata. The user account may be displayed on a social network map as a digital representation of the user account.

In the specification and appended claims, the term "primary user account" means a user account associated with a social network that an obscuring system renders a social network map for. The digital representation of the primary user account may be displayed at a center of a social network map.

In the specification and appended claims, the term "relationship" means an association for each of the user accounts relative to the primary user account. The relationship may be represented as a distance on the social network map, the obscurity level for each of the user accounts, or combinations thereof.

In the specification and appended claims, the term "social network map" means a visual representation of a social network with regard to a primary user account. The social network map may be displayed via a display of a user device. Further, the social network map includes territories associated with user accounts. The territories may be obscured based on an obscurity level.

In the specification and appended claims, the term "obscurity level" means a degree to which a territory associated with each of the digital representations of the number of user accounts on a social network map is obscured. The obscurity level may be represented as a digital fog on the social network map. The obscurity level may be symbolic such as high, medium, low, or none. A high obscurity level may completely obscure, via the digital fog, a territory associated with a digital representation of a user account. A none obscurity level may completely unobscure a territory associated with a digital representation of a user account. Further, the obscurity level may be based on a range such as zero to ten. An obscurity level of ten may completely obscure, via the digital fog, a territory associated with a digital representation of a user account. An obscurity level of zero may completely unobscure a territory associated with a digital representation of a user account.

In the specification and appended claims, the term "digital fog" means a mechanism to obscure digital representations of a number of user accounts on a social network map. The digital fog may be associated with an obscurity level and a territory for a user account.

In the specification and appended claims, the term "display attribute" means a characteristic, with regard to time, displayed on a social network map next to each digital represented user account. The display attribute may be associated with a time since a user associated with a primary user account explored a territory associated with the digital representation of the user account. Further, the display attribute may include a representation of activity since the last visit to the digital representation of the user account.

In the specification and appended claims, the term "digital reward" means prizes, points, recognition, or other digital currency awarded to a primary user account. The digital reward may be based on factors such as time primary user account is logged onto the social network, how many territories the primary user account has explored on the social network map, other factors, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of a system for mapping and obscuring digital representations of a number of user accounts on a social network map, according to one example of principles described herein. As will be described below, a mapping and obscuring system is in communication with a network to identify a primary user account from a number of user accounts of a social network. The mapping and obscuring system determines, based on metadata associated with the user accounts, a relationship for each of the user accounts relative to the primary user account. Further, the mapping and obscuring system maps, based on the relationship for each of the user accounts relative to the primary user account, a digital representation of each of the user accounts to a territory on a social network map. The mapping and obscuring system determines, based on the relationship for each of the user accounts relative to the primary user account, an obscurity level for each of the user accounts.

Further, the mapping and obscuring system obscures, based on the obscurity level, the territory associated with the digital representation of each of the user accounts on a social network map from the primary user account.

As illustrated in FIG. 1, the system (100) includes social network (112). The social network (112) is a network based application to enable a user to create a user account. Once the user account is created, the user establishes connections with other users, such as friends, family, and colleagues in an online environment. Further, once the user is connected with other users, the user may share information, in the form of messages, with each of the other users on the social network (112) by uploading pictures, updating personal information, updating status information, commenting on other user's information, among other activities.

As illustrated in FIG. 1, the system (100) includes a user device (102). The user device (102) allows users of the social network (112) to access the social network (112), create user accounts, establish connections with other users, and share information. As will be described below, the display (104) of the user device (102) is used to display a social network map to a user of a primary user account.

As illustrated in FIG. 1, the system (100) includes a mapping and obscuring system (110). The mapping and obscuring system (110) identifies a primary user account from a number of user accounts of the social network (112). The mapping and obscuring system (110) identifies the primary user account based on the user that accesses the social network (112) via the user device (102).

The mapping and obscuring system (110) determines, based on metadata associated with the user accounts, a relationship for each of the user accounts relative to the primary user account. The metadata may include if the primary user account has established connection with the other user accounts, how long the primary user account has established connection with the other user accounts, how often the user of the primary user account accesses the other user accounts, or combinations thereof.

Further, the mapping and obscuring system (110) maps, based on the relationship for each of the user accounts relative to the primary user account, a digital representation of each of the user accounts to a territory on a social network map. This may be executed via a mapping engine (114-1). If the primary user account has viewed a user account frequently, the digital representation of the user account is mapped to a territory on the social network map close to the digital representation of the primary user account. If the primary user account has viewed a user account infrequently, the digital representation of the user account is mapped to a territory on the social network map far from the digital representation of the primary user account. Further, the proximity of the digital representations of the user accounts to the digital representation of the primary user on the social network map can be based on other attributes other than social network closeness. The other attributes may include similarity, interests, other attributes, or combinations thereof.

The mapping and obscuring system (110) further determines, based on the relationship for each of the user accounts relative to the primary user account, an obscurity level for each of the user accounts. The obscurity level may be represented as a digital fog on the social network map. In some examples, the digital fog may be a full gradient. For example, the denser the digital fog, the higher the obscurity level. In other examples, the digital fog may include three obscurity levels. The three obscurity levels may include a fogged over obscurity level, a grayed out obscurity level, or a fully revealed obscurity level. The fogged over obscurity level may be a dense digital fog that represents a territory on the social network map that the primary user has never visited. The greyed out obscurity level may be a grey colored digital fog that represents a territory on the social network map that the primary user has visited in the past, but has likely changed since the last visit. The fully revealed obscurity level may be absent of the digital fog and represents a territory on the social network map that the primary user has recently visited.

Further, the mapping and obscuring system (110) obscures, based on the obscurity level, the territory associated with the digital representation of each of the user accounts on a social network map from the primary user account. This may be executed via an obscuring engine (114-2). The obscurity level may be modified based on activity of the primary user account. The activity of the primary user account may include how often the primary user visits other user accounts. Such a system allows the digital representations of the user accounts to be mapped and obscured on a social network map. As a result, the primary user is encouraged to explore the social network map.

While this example has been described with reference to the mapping and obscuring system being located over the network, the mapping and obscuring system may be located in any appropriate location. For example, the mapping and obscuring system may be located in a user device, a database, a social network, other locations, or combinations thereof.

FIG. 2 is a diagram of a system for mapping and obscuring digital representations of a number of user accounts on a social network map, according to one example of principles described herein. As mentioned above, the mapping and obscuring system is in communication with a network to identify a primary user account from a number of user accounts of a social network. The mapping and obscuring system determines, based on metadata associated with the user accounts, a relationship for each of the user accounts relative to the primary user account. Further, the mapping and obscuring system maps, based on the relationship for each of the user accounts relative to the primary user account, a digital representation of each of the user accounts to a territory on a social network map. The mapping and obscuring system determines, based on the relationship for each of the user accounts relative to the primary user account, an obscurity level for each of the user accounts. Further, the mapping and obscuring system obscures, based on the obscurity level, the territory associated with the digital representation of each of the user accounts on a social network map from the primary user account.

As illustrated in FIG. 2, the system (200) includes social network (212). The social network (212) may include a number of user accounts (215). The user accounts (215) may include user account A (215-1), user account B (215-2), user account C (215-3), user account D (215-4), user account E (215-5), user account F (215-6), user account G (215-7) and user account H (215-8).

Each of the user accounts (215) may include activities (218). The activities may be in the form of messages, uploaded pictures, updated personal information, updated status information, comments on other user's information, among other activities. As illustrated account A (215-1) includes activity one (218-1) and activity two (218-2). User account B (215-2) includes activity three (218-3) and activity four (218-4). User account C (215-3) includes activity five (218-5) and activity six (218-6). User account D (215-4) includes activity seven (218-7) and activity eight (218-8).

User account E (215-5) includes activity nine (218-9) and activity ten (218-10). User account F (215-6) includes activity eleven (218-11) and activity twelve (218-12). User account G (215-7) includes activity thirteen (218-13) and activity fourteen (218-14). User account H (215-8) includes activity fifteen (218-15) and activity sixteen (218-16).

Further, each of the user accounts (215) may include metadata (220). The metadata (220) may include social connections for a user account, a social network map for a user account, other metadata, or combinations thereof. As illustrated, account A (215-1) includes metadata A (220-1), user account B (215-2) includes metadata B (220-2), user account C (215-3) includes metadata C (220-3), user account D (215-4) includes metadata D (220-4), user account E (215-5) includes metadata E (220-5), user account F (215-6) includes metadata F (220-6), user account G (215-7) includes metadata G (220-7), and user account H (215-8) includes metadata H (220-8).

As illustrated in FIG. 2, the system (200) includes a user device (202). The user device (202) allows users of the social network (212) to access the social network (212), create user accounts, establish connections with other users, and share information. The display (204) of the user device (202) is used to display a social network map for a user of a primary user account.

As illustrated in FIG. 2, the system (200) includes a mapping and obscuring system (210). The mapping and obscuring system (210) includes a processor (207) and computer program code (208). The computer program code (208) includes a number of engines (214). The engines (214) refer to program instructions for performing a designated function. The computer program code (208) causes the processor (207) to execute the designated function of the engines (214). As illustrated, the mapping and obscuring system (210) includes a receiving engine (214-1), an identifying engine (214-2), a relationship determining engine (214-3), a mapping engine (214-4), an obscuring determining engine (214-5), an obscuring engine (214-6), an attribute determining engine (214-7), a displaying engine (214-8), and a presenting engine (214-9).

The receiving engine (214-1) receives the metadata (220) from the user accounts (215) associated with the social network (212). The receiving engine (214-1) may receive all the metadata (220) from the all the user accounts (215). The receiving engine (214-1) may receive the metadata (220) from the user accounts (215) that have established a connection with a primary user account.

The identifying engine (214-2) identifies a primary user account from a number of user accounts (215) of a social network (212). The identifying engine (214-2) may identify the primary user account based on a user accessing the social network (212) via the user device (202). For example, if a user logs onto the social network (212) as user account A (215-1) via the user device (202), the identifying engine (214-2) identifies the primary user account as user account A (215-1). Further, other methods and techniques may be used to identify the primary user account.

The relationship determining engine (214-3) determines, based on the metadata (220) associated with the user accounts (215), a relationship for each of the user accounts (215) relative to the primary user account. If the identifying engine (214-2) identifies the primary user account as user account A (215-1), the relationship determining engine (214-3) determines, based on metadata A (220-1), a relationship for each of the user accounts (215) relative to user account A (215-1). Metadata A (220-1) may specify that user account A (215-1) has established a close relationship with users account B (215-2) and user account D (215-4). Further, metadata A (220-1) may specify that user account A (215-1) has not established connections with user account C (215-3), user account E (215-5), user account F (215-6), user account G (215-7), and user account H (215-8). As will be described in other parts of this specification, the relationship for each of the user accounts relative to the primary user account is represented as a distance on the social network map, the obscurity level for each of the user accounts, or combinations thereof.

The mapping engine (214-4) maps, based on the relationship for each of the user accounts (215) relative to the primary user account, a digital representation of each of the user accounts (215) to a territory on a social network map. As will be described in other parts of this specification, the social network map may map a digital representation of the primary user account to the center of the social network map. Further, the digital representations of each of the user accounts (215) are mapped to territories on a social network map. The further the digital representation of a user account is mapped from the center of the social network map, the weaker the relationship of the user account and the primary user account. Further, the closer the digital representation of a user account is mapped from the center of the social network map, the stronger the relationship of the user account and the primary user account.

The obscuring determining engine (214-5) determines, based on the relationship for each of the user accounts relative to the primary user account, an obscurity level for each of the user accounts. The obscurity level represents a degree to which a user associated with the primary user account has explored the territory related to the digital representation of each of the user accounts on the social network map.

The obscuring engine (214-6) obscures, based on the obscurity level, the territory associated with the digital representation of each of the user accounts (215) on a social network map from the primary user account. The obscuring engine (214-6) may obscures the territories associated with the digital representations of each of the user accounts (215) by rendering a digital fog over the territories.

The attribute determining engine (214-7) determines a display attribute for each of the user accounts. The display attribute may represent contact relationship, or activity criteria associated with the each of the user accounts (215). The display attribute may include a time since the user of the primary user account view the user accounts (215).

The displaying engine (214-8) displays the social network map on a display (204) of a user device (202) for a user associated with the primary user account. As will be described later on in this specification, the social network map includes digital representations of a number of primary user accounts, digital representations of user accounts, and digital fog.

The presenting engine (214-9) presents a digital reward to the primary user account based on exploration of the social network map. The digital rewards may include badges or achievement. The digital rewards can be customized to the primary user account to encourage different behaviors. The digital reward can be rewarded based on exploring great distances of the social network map to encourage greater connectivity.

An overall example of FIG. 2 will now be described. A user logs onto the social network (212), via the user device (202), as user account A (215-1). The receiving engine (214-1) receives the metadata (220) from the user accounts (215) associated with the social network (212). The identifying engine (214-2) identifies a primary user account from the number of user accounts (215) of a social network (212). The identifying engine (214-2) identifies the primary user account as user account A (215-1). The relationship determining engine (214-3) determines, based on metadata (220) associated with the user accounts (215), a relationship for each of the user accounts (215) relative to the primary user account. The relationship determining engine (214-3) determines user account A (215-1) has a close relationship with a user associated with user account B (215-1). Further, the relationship determining engine (214-3) determines user account A (215-1) has no relationship with the other users associated with the other user accounts.

The mapping engine (214-4) maps, based on the relationship for each of the user accounts relative to the primary user account, a digital representation of each of the user accounts (215) to a territory on a social network map. The mapping engine (214-4) maps a digital representation of user account A (215-1) to a center of the social network map. The mapping engine (214-4) maps a digital representation of user account B (215-2) to a territory close to the center of the social network map. Further, the mapping engine (214-4) maps the rest of the digital representations of the user accounts to territories far from the center of the social network map. The obscurity determining engine (214-5) determines, based on the relationship for each of the user accounts relative to the primary user account, an obscurity level for each of the user accounts. The obscurity determining engine (214-5) determines the obscurity level for user account B (215-2) is zero. Further, the obscurity determining engine (214-5) determines the obscurity levels for the other user accounts are ten.

The obscuring engine (214-6) obscures, based on the obscurity level, the territory associated with the digital representation of each of the user accounts on a social network map from the primary user account. The obscuring engine (214-6) does not obscure the digital representation of user account B (215-2). However, the obscuring engine (214-6) does obscure the digital representations of the other user accounts via a dense digital fog. The attribute determining engine (614-7) determines a display attribute for each of the user accounts. If the user of user account A (215-1) last visited user account B (215-2) one hour ago, the attribute determining engine (614-7) determines the display attribute to display on the social network map next to the digital representation of user account B (215-2) is one hour.

The displaying engine (215-8) displays the social network map on a display (204) of a user device (202) for a user associated with the primary user account. Since user account A (215-1) has been determined as the primary user account, the social network map for user account A (215-1) is displayed on the display (204) of the user device (202). As the user of user account A (215-1) explores the social network map, the presenting engine (214-9) presents a digital reward.

Figure 3A:
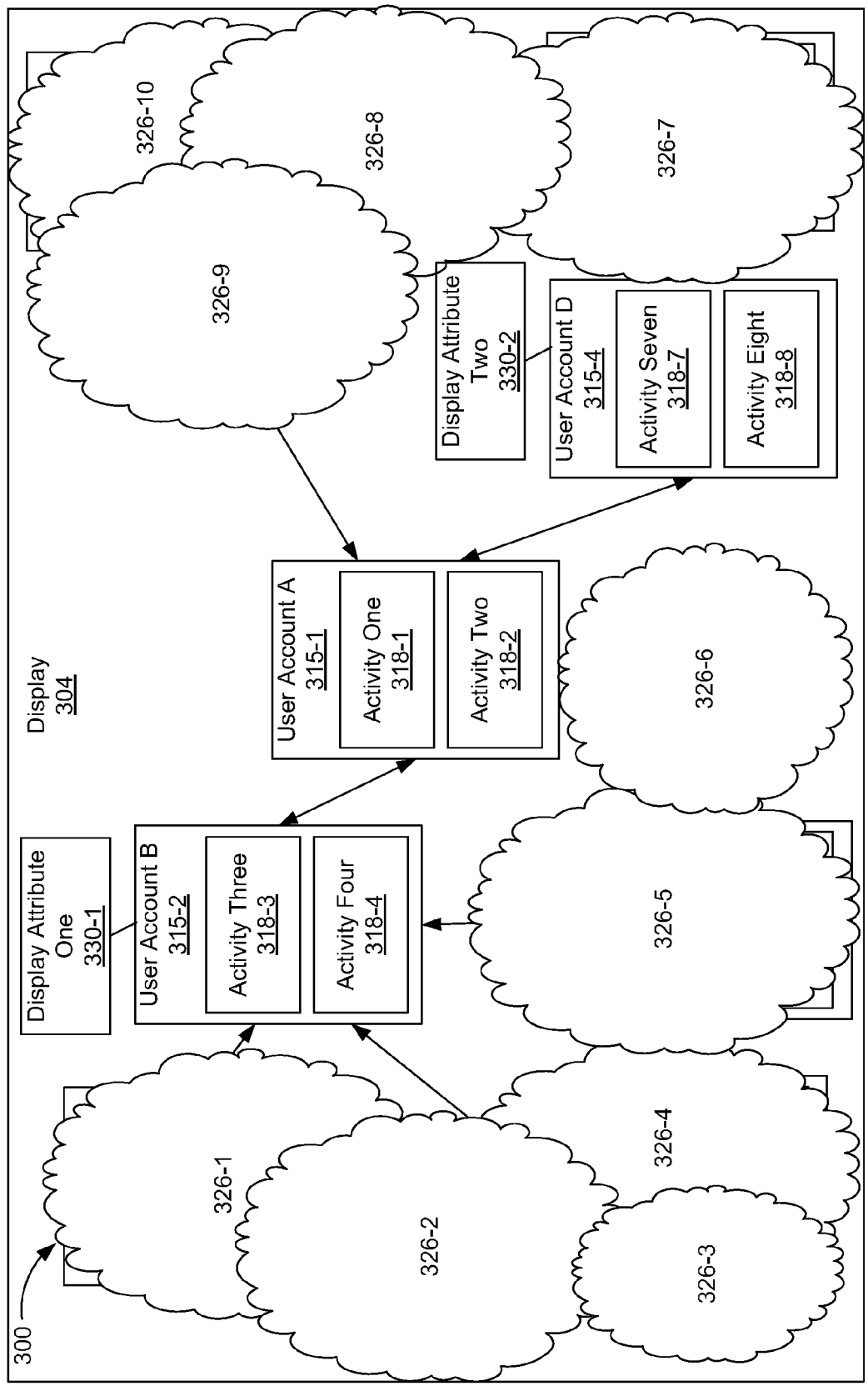
FIG. 3A is a diagram of a social network map with mapped and obscured digital representations of user accounts, according to one example of principles described herein.

FIG. 3A is a diagram of a social network map with mapped and obscured digital representations of user accounts, according to one example of principles described herein. As will be described below, a social network map is displayed to a user associated with a primary user account. The social network may include a digital representation of the primary user account and user accounts.

As illustrated in FIG. 3A, a social network map (300) is displayed on a display (304). This social network map (300) may be an initial state before the primary user explores the social network map (300). The social network map (300) may include a display a digital representation of a primary user account. The digital representation of the primary user account may be displayed in the center of the social network map (300). As depicted, user account A (315-1) is the primary user account. Further, the activity associated with user account A (315-1), such as activity one (318-1) and activity two (318-2), is displayed on the social network map (300).

As mentioned above, a mapping engine maps, based on the relationship for each of the user accounts relative to the primary user account, a digital representation of each of the user accounts to a territory on a social network map. As illustrated, the mapping engine maps user account B (315-2) and user account D (315) close to user account A (315-1) on the social network map (300). Further, user account B (315-2) and user account D (315) may include activity three (318-3), activity four (318-4), activity seven (318-7), and activity eight (318-8) respectively.

Further, other user accounts are also mapped to the social network map (300). However, the other user accounts are obscured from user account A (315-1) as determined by the obscuring system of FIG. 2. As illustrated, the other user accounts are obscured via digital fog (326).

Further, the social network map (300) may include display attributes (330). Display attribute one (330-1) may indicate that user account A (315-1) visited user account B (315-2) one hour ago. Display attribute two (330-2) may indicate that user account A (315-1) visited user account D (315-4) one day ago.

Figure 3B:
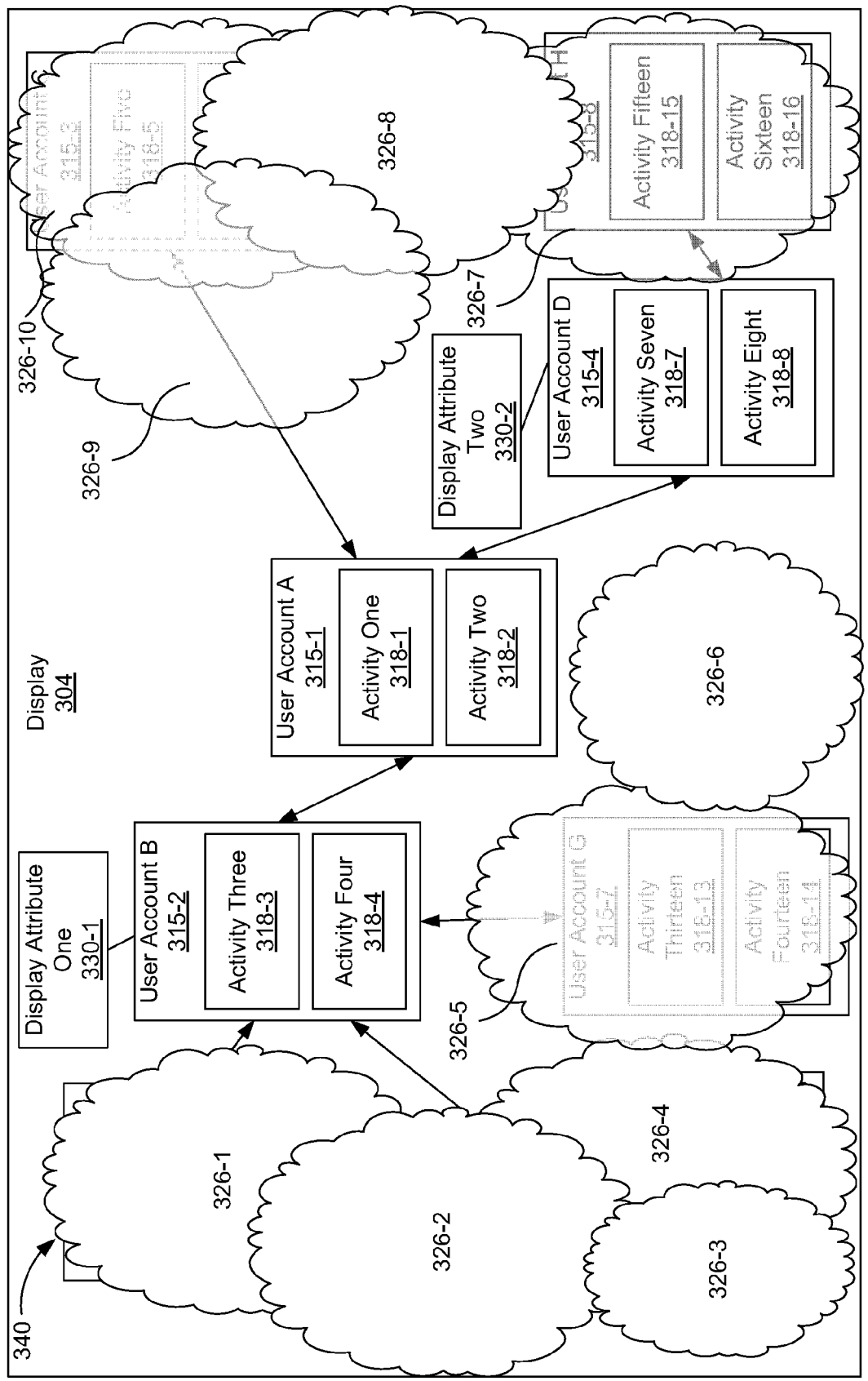
FIG. 3B is a diagram of a social network map with mapped and partially obscured digital representations of user accounts, according to one example of principles described herein.

FIG. 3B is a diagram of a social network map with mapped and partially obscured digital representations of user accounts, according to one example of principles described herein. As mentioned above, an obscuring engine may obscure the territory associated with the digital representation of each of the user accounts by rendering a digital fog over the territories. Further, the obscurity level of the digital fog may be modified based on a passage of time since the user of the primary user account lasted visited or viewed the digital representation of each of the user accounts.

As user account A (315) explores territories of the social network map (340), the obscurity level may be modified. As illustrated, the obscurity level as represented by digital fog 326-5, 326-7, 326-9, and 326-10 has been modified from the digital fog in FIG. 3A. Digital fog 326-5, 326-7, 326-9, and 326-10 has been reduced. Digital fog 326-5, 326-7, 326-9, and 326-10 may be reduced based on activity of the user account A (315-1).

Figure 3C:
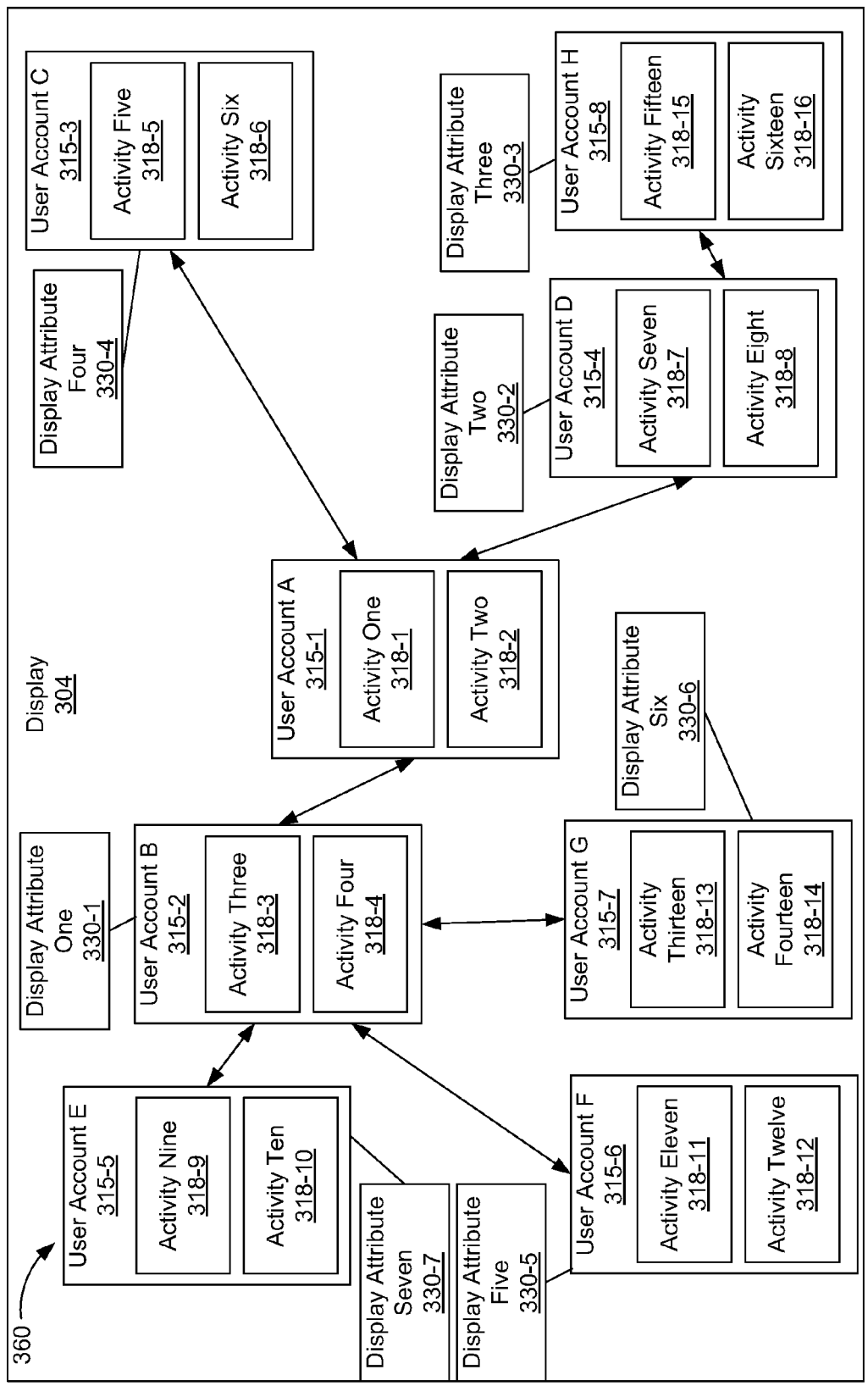
FIG. 3C is a diagram of a social network map with mapped and no obscured digital representations of user accounts, according to one example of principles described herein.

FIG. 3C is a diagram of a social network map with mapped and no obscured digital representations of user accounts, according to one example of principles described herein. As mentioned above, an obscuring engine may obscure the territory associated with the digital representation of each of the user accounts by rendering a digital fog over the territories. Further, the obscurity level of the digital fog may be modified based on a passage of time since the user of the primary user account lasted visited or viewed the digital representation of each of the user accounts.

As illustrated in FIG. 3C, if user account A (315-1) visits all the territories of the social network map (380), the obscurity level may be reduced to zero. As a result, all the user accounts (315) and all the activities (318) associated with the user accounts (315) are no longer obscured.

Figure 3D:
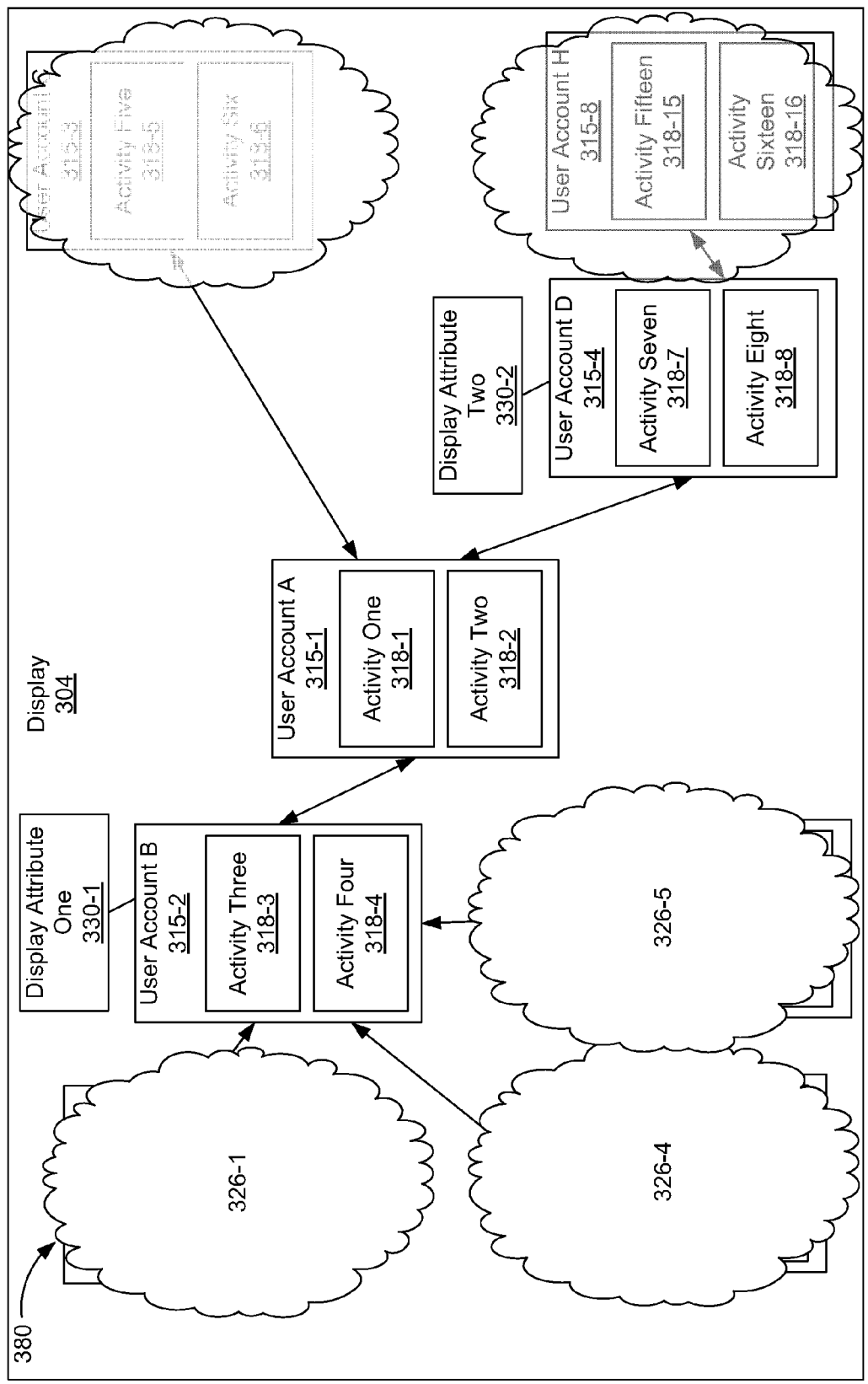
FIG. 3D is a diagram of a social network map with mapped and partially obscured digital representations of user accounts, according to one example of principles described herein.

FIG. 3D is a diagram of a social network map with mapped and partially obscured digital representations of user accounts, according to one example of principles described herein. As mentioned above, an obscuring engine may obscure the territory associated with the digital representation of each of the user accounts by rendering a digital fog over the territories. Further, the obscurity level of the digital fog may be modified based on a passage of time since the user of the primary user account lasted visited or viewed the digital representation of each of the user accounts.

If the user of the primary user account fails to continue to visit and/or explore the territories associated with the user account as the user accounts are modified over time, the territories associated with a user account may fog back over via the digital fog. As illustrated in FIG. 3D, the obscurity level may be modified thus increasing the digital fog for territories associated with some of the user accounts. As a result, some of the user accounts (315) are obscured via the digital fog (326).

Figure 4:
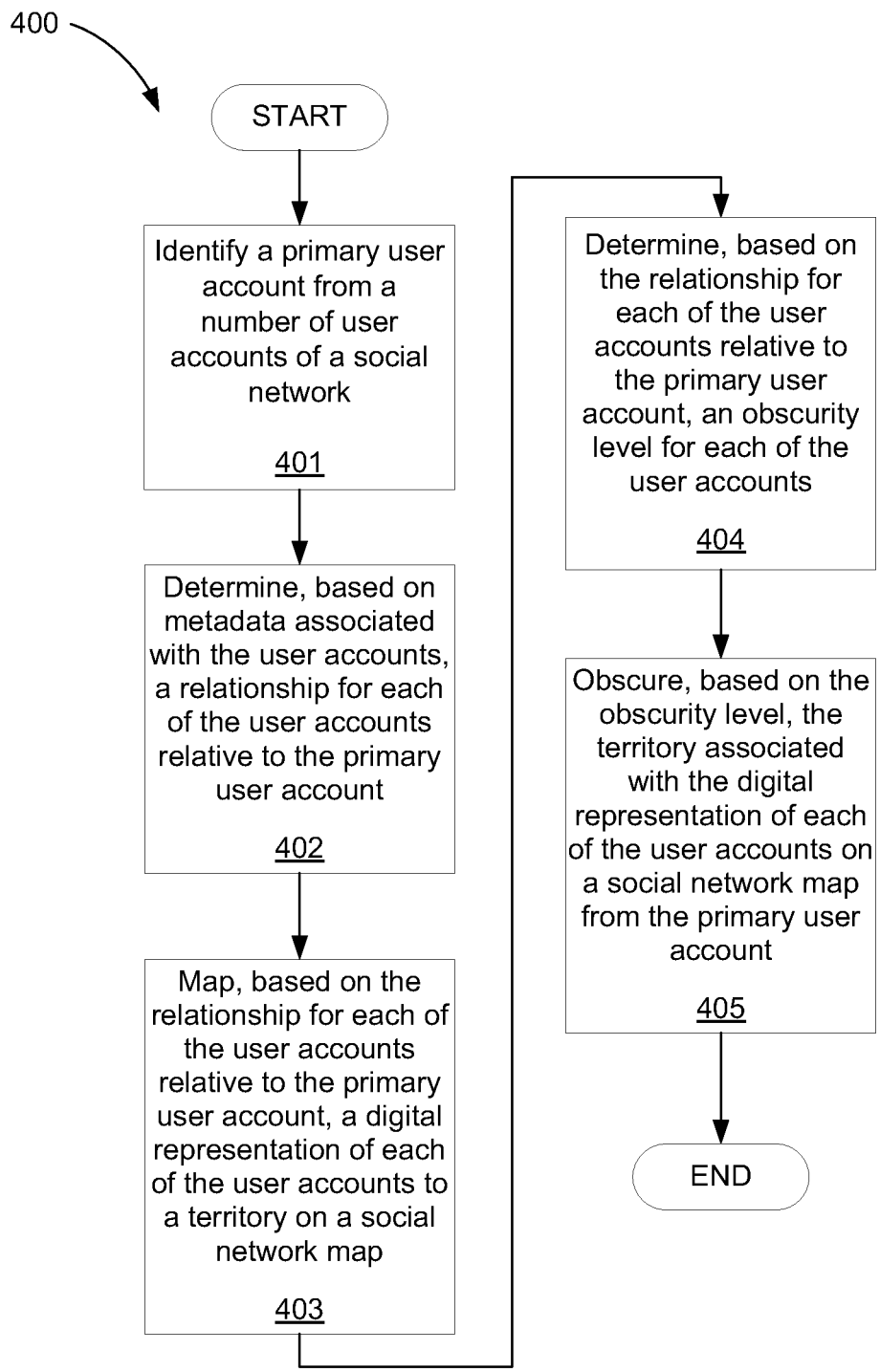
FIG. 4 is a flowchart of a method for mapping and obscuring digital representations of a number of user accounts on a social network map, according to one example of principles described herein.

FIG. 4 is a flowchart of a method for mapping and obscuring digital representations of a number of user accounts on a social network map, according to one example of principles described herein. In one example, the method (400) may be executed by the mapping and obscuring system (110) of FIG. 1. In other examples, the method (400) may be executed by other systems (i.e. system 200, system 600, and system 700). In this example, the method (400) includes identifying (401) a primary user account from a number of user accounts of a social network, determining (402), based on metadata associated with the user accounts, a relationship for each of the user accounts relative to the primary user account, mapping (403), based on the relationship for each of the user accounts relative to the primary user account, a digital representation of each of the user accounts to a territory on a social network map, determining (404), based on the relationship for each of the user accounts relative to the primary user account, an obscurity level for each of the user accounts, and obscuring (405), based on the obscurity level, the territory associated with the digital representation of each of the user accounts on a social network map from the primary user account.

As mentioned above, the method (400) includes identifying (401) a primary user account from a number of user accounts of a social network. The method (400) may identify the primary user account from the number of user accounts of a social network via various methods and techniques. The primary user account may be identified based on a user logged onto the social network.

As mentioned above, the method (400) includes determining (402), based on metadata associated with the user accounts, a relationship for each of the user accounts relative to the primary user account. The relationship for each of the user accounts relative to the primary user account may be based on a time. For example, if the primary user account has established a social connection with a user account for years, the relationship may be strong. If the primary user account has established a social connection with a user account a few minutes ago, the relationship may be weak. The relationship for each of the user accounts relative to the primary user account may be based on frequency. If the primary user account accesses and/or shares information on a daily bases with a user account, the relationship may be strong. If the primary user account never accesses and/or shares information on a daily bases with a user account, the relationship may be weak.

As mentioned above, the method (400) includes mapping (403), based on the relationship for each of the user accounts relative to the primary user account, a digital representation of each of the user accounts to a territory on a social network map. The method (400) may map digital representation of number of user accounts to a territory close, in terms of distance, to the primary user account on the social network map if the relationship between the user account and the primary user account is strong. The method (400) may map digital representation of a number of user accounts to a territory far, in terms of distance, to the primary user account on the social network map if the relationship between the user account and the primary user account is weak. As a result, the closer the user account is, in terms of distance, to the primary user account, the stronger the relationship. In some examples, the relationship between the user accounts and the primary user may be modified. As a result, the distance of the user accounts and the primary user may be modified.

Further, successful expansion of the primary user's social network is encouraged through careful consideration of proximity, in terms of distance. Recommendation algorithms may be used to map the digital representations of the user accounts relative to the digital representation of the primary user account on the social network map. Mutual friends or interests are mapped closest the center of the social network map and are most likely to be discovered through exploration of the digital fog nearby. This can be adapted based on the interests and goals of the social network, supporting the network's business goals.

As mentioned above, the method (400) includes determining (404), based on the relationship for each of the user accounts relative to the primary user account, an obscurity level for each of the user accounts. The obscurity level may be modified based on activity of the primary user account. If the user of the primary user account fails to visit and/or explore territory related to each of the user accounts, the obscurity level may be increased. As a result, the digital fog for the territories related to each of the user accounts increases.

As mentioned above, the method (400) includes obscuring (405), based on the obscurity level, the territory associated with the digital representation of each of the user accounts on a social network map from the primary user account. If the obscurity level is high for the territory associated with digital representations of a number of user accounts on a social network map, the digital fog may obscure the digital representation of user accounts on the social network map. This may not allow the primary user account to fully view the digital representation of the user account. If the obscurity level is low for the territory associated with digital representations of a number of user accounts on a social network map, the digital fog may not be present. As a result, the primary user account may fully view the digital representation of the user account on the social network map.

Figure 5:
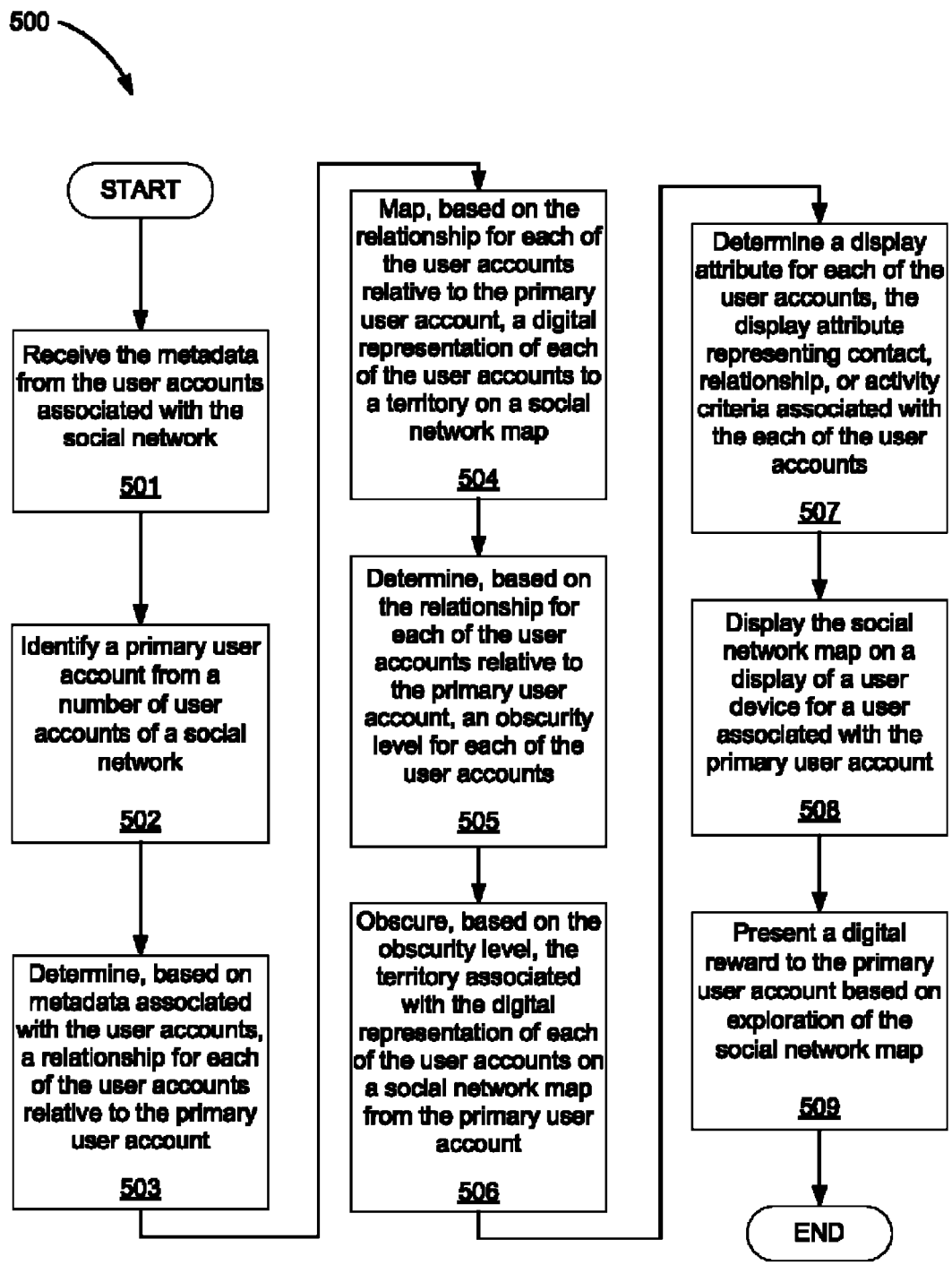
FIG. 5 is a flowchart of a method for mapping and obscuring digital representations of a number of user accounts on a social network map, according to one example of principles described herein.

FIG. 5 is a flowchart of a method for mapping and obscuring digital representations of a number of user accounts on a social network map, according to one example of principles described herein. In one example, the method (500) may be executed by the system of FIG. 1. In other examples, the method (500) may be executed by other systems (i.e. system 200, system 600 and system 700). In this example, the method (500) includes receiving (501) the metadata from the user accounts associated with the social network, identifying (502) a primary user account from a number of user accounts of a social network, determining (503), based on metadata associated with the user accounts, a relationship for each of the user accounts relative to the primary user account, mapping (504), based on the relationship for each of the user accounts relative to the primary user account, a digital representation of each of the user accounts to a territory on a social network map, determining (505), based on the relationship for each of the user accounts relative to the primary user account, an obscurity level for each of the user accounts, obscuring (506), based on the obscurity level, the territory associated with the digital representation of each of the user accounts on a social network map from the primary user account, determining (507) a display attribute for each of the user accounts, the display attribute representing contact, relationship, or activity criteria associated with the each of the user accounts, displaying (508) the social network map on a display of a user device for a user associated with the primary user account, and presenting (509) a digital reward to the primary user account based on exploration of the social network map.

As mentioned above, the method (500) includes receiving (501) the metadata from the user accounts associated with the social network. As described above, the metadata may aid the method (500) in determining relationships and obscurity levels for each of the user accounts relative to the primary account.

As mentioned above, the method (500) includes determining (507) a display attribute for each of the user accounts, the display attribute representing contact, relationship, or activity criteria associated with the each of the user accounts. The display attribute may be displayed on the social network map as described above.

As mentioned above, the method (500) includes displaying (508) the social network map on a display of a user device for a user associated with the primary user account. The digital representations of the primary user account and the user accounts may be customized based on various templates. A template may specify that the digital representations of the primary user account and the user accounts are rendered as avatars. Another template may specify that the digital representations of the primary user account and the user accounts are rendered as buildings.

As mentioned above, the method (500) includes presenting (509) a digital reward to the primary user account based on exploration of the social network map. The user of the primary user account may explore the social network map by clicking on areas of the social network map. Further, the user of the primary user account may explore the social network map through moving an avatar.

While this method (500) has been described with reference to user accounts, the method (500) may apply to communities, projects, and followings. The communities may include groups of user accounts acting as a single user account. Gamification can reward community members who expand the reach of the community by making contacts with nearby communities. Further, projects may be divided into continents on a social network map and movement between continents may be enabled to quickly jump between contexts of the project. Water between the continents may represent lower value noise between distinct concepts and/or continents which isn't of relevance to any of the users interests yet could still be explored at a rough level to look for relationships between distinct projects that might otherwise not be apparent. Further, with following, territories or entire social network maps may be shared with individuals, groups, or publically.

Figure 6:
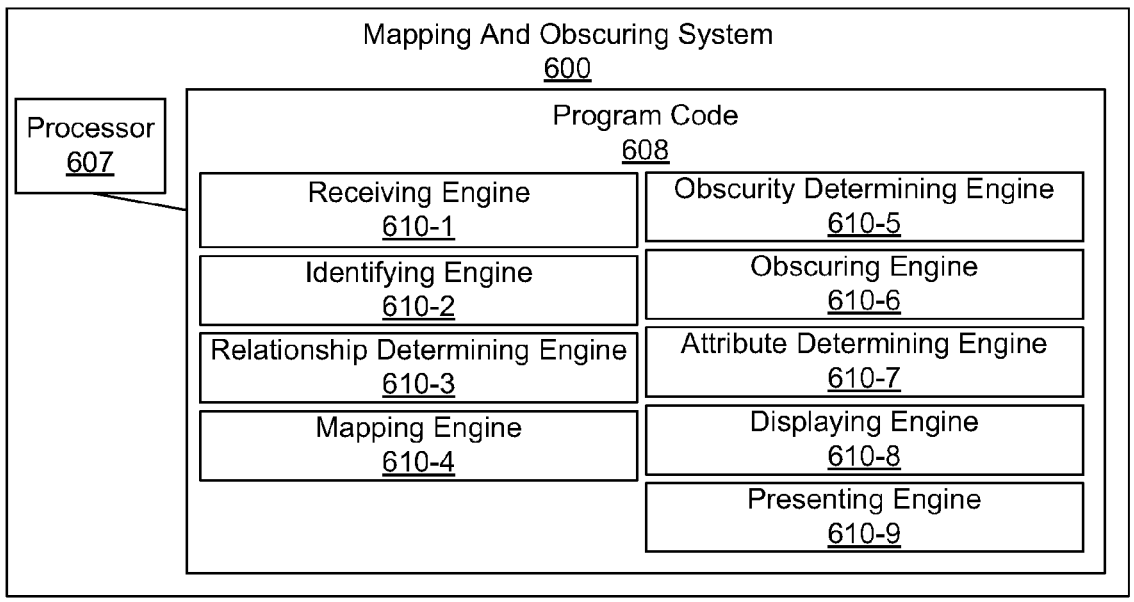
FIG. 6 is a diagram of an example of a mapping and obscuring system, according to the principles described herein.

FIG. 6 is a diagram of an example of a mapping and obscuring system, according to the principles described herein. The mapping and obscuring system (600) includes a processor (607) and computer program code (608). The computer program code (608) includes a number of engines (614). The engines (614) refer to program instructions for performing a designated function. The computer program code (608) causes the processor (607) to execute the designated function of the engines (614). As illustrated, the mapping and obscuring system (610) includes a receiving engine (614-1), an identifying engine (614-2), a relationship determining engine (614-3), a mapping engine (614-4), an obscuring determining engine (614-5), an obscuring engine (614-6), an attribute determining engine (614-7), a displaying engine (614-8), and a presenting engine (614-9).

The receiving engine (610-1) receives the metadata from the user accounts associated with the social network. The receiving engine (610-1) may receive the metadata from all the user accounts associated with the social network. The receiving engine (610-1) may receive the metadata from the user accounts connected to the primary user account.

The identifying engine (610-2) identifies a primary user account from a number of user accounts of a social network. The identifying engine (610-2) identifies one primary user account from a number of user accounts of a social network. The identifying engine (610-2) may identify several primary user accounts from a number of user accounts of a social network.

The relationship determining engine (610-3) determines, based on metadata associated with the user accounts, a relationship for each of the user accounts relative to the primary user account. The relationship determining engine (610-3) determines, based on metadata associated with the user accounts, one relationship for each of the user accounts relative to the primary user account. The relationship determining engine (610-3) determines, based on metadata associated with the user accounts, several relationships for each of the user accounts relative to the primary user account.

The mapping engine (610-4) maps, based on the relationship for each of the user accounts relative to the primary user account, a digital representation of each of the user accounts to a territory on a social network map. The mapping engine (610-4) may map a digital representation a user account to a territory on a social network map close to the digital representation of the primary user account. The mapping engine (610-4) may map a digital representation a user account to a territory on a social network map far from the digital representation of the primary user account.

The obscurity determining engine (610-5) determines, based on the relationship for each of the user accounts relative to the primary user account, an obscurity level for each of the user accounts. The obscurity determining engine (610-5) determines the obscurity level for each of the user accounts based on activity of the primary user such as a passage of time since the user of the primary user account lasted visited or viewed the digital representation of each of the user accounts.

The obscuring engine (610-6) obscures, based on the obscurity level, the territory associated with the digital representation of each of the user accounts on a social network map from the primary user account. The obscurity level may be rendered as a digital fog on the social network map.

The attribute determining engine (610-7) determines a display attribute for each of the user accounts, the display attribute representing contact, relationship, or activity criteria associated with the each of the user accounts. The display attribute may be displayed on the social network map.

The displaying engine (610-8) displays the social network map on a display of a user device for a user associated with the primary user account. The displaying engine (610-8) may display a portion of the social network map. The displaying engine (610-8) may display the entire social network map.

The presenting engine (610-9) presents a digital reward to the primary user account based on exploration of the social network map. The presenting engine (610-9) may present one digital reward to the primary user account based on exploration of the social network map. The presenting engine (610-9) may present several digital reward to the primary user account based on exploration of the social network map.

Figure 7:
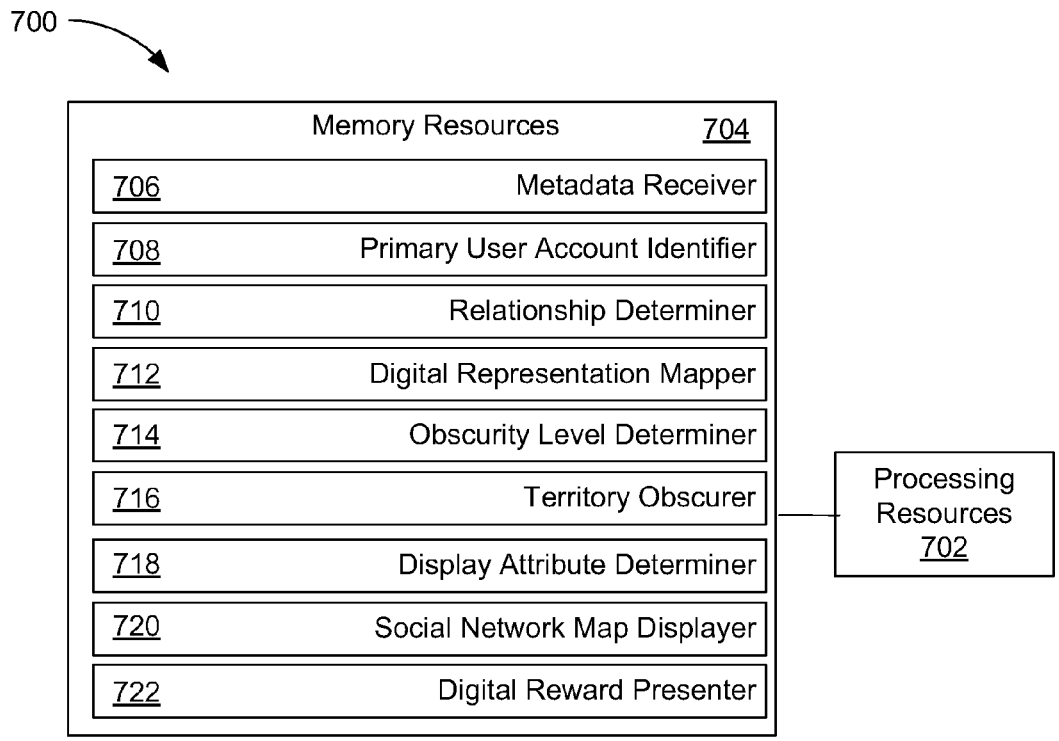
FIG. 7 is a diagram of an example of a mapping and obscuring system, according to the principles described herein.

FIG. 7 is a diagram of an example of a mapping and obscuring system, according to the principles described herein. In this example, the mapping and obscuring system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the mapping and obscuring system (700). The programmed instructions shown stored in the memory resources (704) include a metadata receiver (706), a primary account identifier (708), a relationship determiner (710), a digital representation mapper (712), an obscurity level determiner (714), a territory obscurer (716), a display attribute determiner (718), a social network map displayer (720), and a digital reward presenter (722).

The memory resources (704) include a computer readable storage medium that contains computer readable program code to cause tasks to be executed by the processing resources (702). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The metadata receiver (706) represents programmed instructions that, when executed, cause the processing resources (702) to receive the metadata from the user accounts associated with the social network. The primary account identifier (708) represents programmed instructions that, when executed, cause the processing resources (702) to identify a primary user account from a number of user accounts of a social network.

The relationship determiner (710) represents programmed instructions that, when executed, cause the processing resources (702) to determine, based on metadata associated with the user accounts, a relationship for each of the user accounts relative to the primary user account. The digital representation mapper (712) represents programmed instructions that, when executed, cause the processing resources (702) to map, based on the relationship for each of the user accounts relative to the primary user account, a digital representation of each of the user accounts to a territory on a social network map.

The obscurity level determiner (714) represents programmed instructions that, when executed, cause the processing resources (702) to determine, based on the relationship for each of the user accounts relative to the primary user account, an obscurity level for each of the user accounts. The territory obscurer (716) represents programmed instructions that, when executed, cause the processing resources (702) to obscure, based on the obscurity level, the territory associated with the digital representation of each of the user accounts on a social network map from the primary user account.

The display attribute determiner (718) represents programmed instructions that, when executed, cause the processing resources (702) to determine a display attribute for each of the user accounts, the display attribute representing contact, relationship, or activity criteria associated with the each of the user accounts. The social network map displayer (720) represents programmed instructions that, when executed, cause the processing resources (702) to display the social network map on a display of a user device for a user associated with the primary user account. The digital reward presenter (722) represents programmed instructions that, when executed, cause the processing resources (702) to present a digital reward to the primary user account based on exploration of the social network map.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries, may be accessed from a remote location over a network connection while the programmed instructions are located locally. Thus, mapping and obscuring system (700) may be implemented on a user device, on a server, on a collection of servers, or combinations thereof.

The mapping and obscuring system (700) of FIG. 7 may be part of a general purpose computer. However, in alternative examples, the mapping and obscuring system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A system for mapping and obscuring digital representations of a number of user accounts on a social network map, the system comprising:
   a hardware processor;
   computer program code, communicatively coupled to the processor, the computer program code comprising:
      a receiving engine to receive metadata from user accounts associated with a social network;
      an identifying engine to identify a primary user account from the user accounts of the social network;
      a relationship determining engine to determine, based on the metadata associated with the user accounts, a relationship for each of the user accounts relative to the primary user account;
      a mapping engine to map, based on the relationship for each of the user accounts relative to the primary user account, a digital representation of each of the user accounts to a territory on the social network map;
      an obscurity determining engine to determine, based on the relationship for each of the user accounts relative to the primary user account, an obscurity level for each of the user accounts;
      an obscuring engine to obscure, based on the determined obscurity level, the territory associated with the digital representation of each of the user accounts on the social network map from the primary user account by decreasing visibility of at least a portion of each territory being obscured;
      an attribute determining engine to determine a display attribute for each of the user accounts, the display attribute representing contact, relationship, or activity criteria associated with the each of the user accounts;
      a displaying engine to display the social network map on a display of a user device for a user associated with the primary user account; and
      a presenting engine to present a digital reward to the primary user account based on exploration of the social network map.

2. The system of claim 1, in which the relationship for each of the user accounts relative to the primary user account is represented as a distance on the social network map.

3. The system of claim 1, in which the obscurity level represents a degree to which a user associated with the primary user account has explored the territory related to the digital representation of each of the user accounts on the social network map.

4. The system of claim 1, in which the obscurity level is modified based on activity of the primary user account.

5. A computer program product for mapping and obscuring digital representations of a number of user accounts on a social network map, comprising:
   a non-transitory computer readable storage medium, said tangible computer readable storage medium comprising computer readable program code embodied therewith, said computer readable program code comprising program instructions that, when executed, causes a processor to:
      identify a primary user account from user accounts of a social network;
      determine, based on the metadata associated with the user accounts, a relationship for each of the user accounts relative to the primary user account;
      map, based on the relationship for each of the user accounts relative to the primary user account, a digital representation of each of the user accounts to a territory on the social network map;
      determine, based on the relationship for each of the user accounts relative to the primary user account, the obscurity level for each of the user accounts; and
      obscure, based on the determined obscurity level, the territory associated with the digital representation of each of the user accounts on the social network map from the primary user account by decreasing visibility of at least a portion of each territory being obscured;
      determine a display attribute for each of the user accounts, the display attribute representing contact, relationship, or activity criteria associated with the each of the user accounts;
      display the social network map on a display of a user device for a user associated with the primary user account; and
      present a digital reward to the primary user account based on exploration of the social network map.

6. The product of claim 5, further comprising computer readable program code comprising program instructions that, when executed, cause said processor to receive the metadata from the user accounts associated with the social network.

7. The product of claim 5, in which the relationship for each of the user accounts relative to the primary user account is represented as a distance on the social network map.

8. The product of claim 5, in which the obscurity level represents a degree to which a user associated with the primary user account has explored the territory related to the digital representation of each of the user accounts on the social network map.

9. The product of claim 5, in which the obscurity level is modified based on activity of the primary user account.

10. A system for promoting expansion of a social network, the system comprising:
    a server computer supporting a social network;
    computer program code, communicatively coupled to the server computer, the computer program code, when executed, causing the server computer to:
       determine a social relationship between a primary user of the social network and a number of other users of the social network based on comparing data for the primary user with data for the other users of the social network;
       determine, based on the relationship for each of the user accounts relative to the primary user account, an obscurity level for each of the user accounts;
       obscure, based on the determined obscurity level, a territory associated with the digital representation of each of the user accounts on a social network map from the primary user account by decreasing visibility of at least a portion of each territory being obscured;
       determine a display attribute for each of the user, the display attribute representing contact, relationship, or activity criteria associated with the each of the other users;

present a social network map showing a representation of the primary user and the number of other users of the social network, wherein a strength of the determined social relationship between each other user and the primary user is indicated on the social network map.

11. The system of claim 10, the server computer to reveal identify of one of the other users who was obscured in response to the primary user exploring a corresponding part of the social network map.

12. The system of claim 10, wherein some parts of the social network map are more obscured than other parts.

13. The system of claim 10, wherein the strength of the social relationship between the primary user and the other users is indicated on the social network map by a level by which representation of the other users is obscured, with a first other user having a weaker relationship to the primary user having a more obscured representation on the social network map than a second other user having a stronger relationship to the primary user.

14. The system of claim 10, wherein the primary user does not yet have an established connection in the social network to at least one of the other users represented on the social network map.

15. The system of claim 10, the server computer to present a digital reward to the primary user based on exploration of the presented social network map.

16. The system of claim 10, wherein a level of obscurity obscuring identity of a first other user changes over time based on how long since the primary user has visited an account for the first other user.

17. The system of claim 10, further comprising obscuring at least parts of the social network map with a digital fog.

18. The system of claim 10, wherein the data that is compared comprises any of: whether the primary user has established a connection with an account of the other users, how long the primary user has had an established connection with an account of the other users, how often the primary user accesses accounts of the other user.

19. The system of claim 10, further comprising displaying an indication on the social network map as to how long ago the primary user visited an account of one of the other users represented on the social network map.

20. The system of claim 10, further comprising representing the primary user and number of other users on the social network map using avatars.

21. The system of claim 10, further comprising:
receiving user input selecting an obscured part of the social network map; and
revealing identification of at least one of the other users associated with that selected part of the social network map by ceasing to obscure that selected part of the social network map.

\* \* \* \* \*